2 Sheets--Sheet 2.

A. K. LEE.
Bleaching Resins.

No. 139,402. Patented May 27, 1873.

Witnesses:
T. C. Brecht.
Edwin James.

Inventor:
Archibald K. Lee.
per J. E. P. Holmead
Attorney.

UNITED STATES PATENT OFFICE.

ARCHIBALD K. LEE, OF GALVESTON, TEXAS.

IMPROVEMENT IN BLEACHING RESINS.

Specification forming part of Letters Patent No. 139,402, dated May 27, 1873; application filed May 15, 1873.

*To all whom it may concern:*

Be it known that I, ARCHIBALD K. LEE, of the city and county of Galveston and State of Texas, have invented an Improved Method of Bleaching Resin, of which the following is a full, clear, and exact description, reference being had to the accompanying drawing and the letters of reference marked thereon, making part of this specification, in which—

Figure 1:
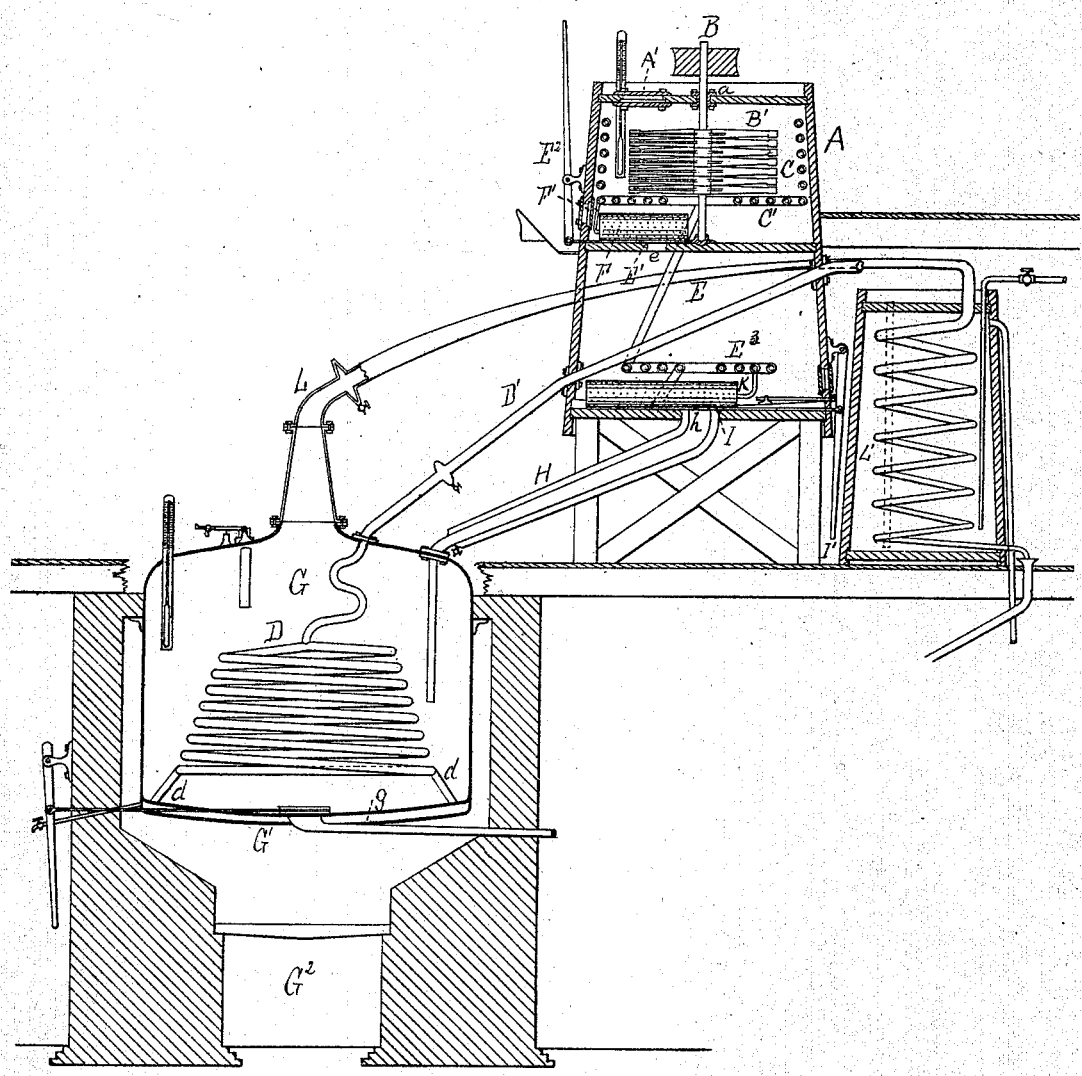
Figure 2:
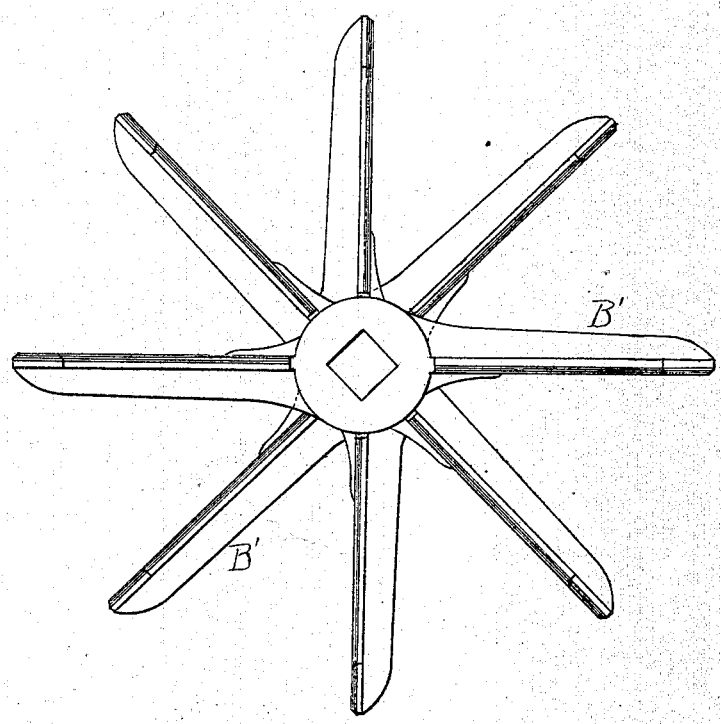
Figure 3:
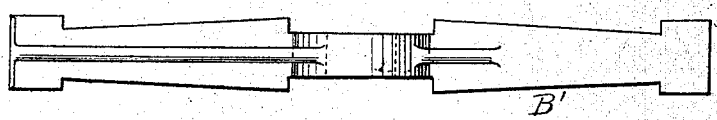
Figure 4:
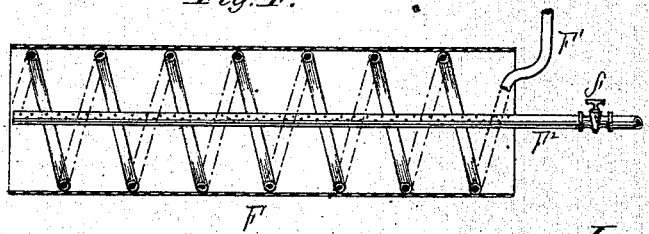

Figure 1 is a vertical sectional view. Fig. 2 is a side view of the stirrer or agitator. Fig. 3 is a top-plan view of one of the arms of the agitator. Fig. 4 is a longitudinal sectional view of one of the strainers.

My invention has as its object to so bleach, clarify, and refine the commonest and lowest grade of resin, and such as is now known to the trade as black resin, as to produce therefrom, by a cheap and simple means or process, an article as pure as extra pale, or resin which is the product of the virgin dip, and which for use in all the arts where the finest quality of resin is desirable or required, is equally as valuable.

My invention is as follows: I take the cheapest and commonest quality of black resin and by any suitable means break it into small lumps; or, what is still better, pulverize the same or reduce it to a fine powder. The resin, having been thus reduced to small lumps, or in a powdered condition, is placed in a heated vessel, and while under agitation, or by any suitable means stirred so as to insure the positive and continued disintegration of the mass, is subjected to the direct raking action of jets of steam either with or without the fumes of sulphur or chlorine. Practical experience has fully attested the fact that resin thus treated will melt and is bleached at a degree of heat far below 276° Fahrenheit, or the degree of heat at which now by any other process the same results are or can be accomplished. The resin thus melted and bleached I pass through a strainer, so as to free the same as far as possible of all impurities, especially such as contain coloring matter. The liquid resin thus freed of impurities and coloring matter, and in a comparatively pure condition, but opaque or of a whitish color, I run off into a suitable reservoir or other receptacle, and from which, in such quantities as will best insure the rapid vaporization of the water which is incorporated with the now liquid resin, and which renders it opaque, I feed to a still or other steam-chamber; and in which, at a degree of heat just sufficient to produce evaporation, the water is dissipated from the liquid, leaving an article of resin as pure in quality and in all respects, and for all the purposes of the arts, equal in value, if not superior, to that which is recognized as extra pale, or the resin which is the product of the virgin dip.

The construction and operation of my invention are as follows: The apparatus illustrated in the accompanying drawing is in all respects substantially the same as that embraced in and covered by my patent of May 6, 1873, for turpentine-stills, and therefore its distinctive features constitute no part of my present invention, and is simply referred to as embracing or furnishing a simple and practical means of developing my process of bleaching, refining, and clarifying resin. But I desire it distinctly understood that there is nothing arbitrary about its use, as any other style of apparatus capable of accomplishing like results may be substituted. As I have said the distinctive features of this apparatus are claimed in my former patent, I will only here so refer to the same as to render their use in the treatment of resin intelligible.

A is the liquidizing-tub, which is of any desired form and dimensions, and is constructed of any suitable material. This tub A is provided with a revolving agitator or stirrer, consisting of a vertical shaft, B, which is journaled in suitable bearings *a a* at the upper and lower sections of the tub, and at their respective centers. To this shaft B are attached a series of radial arms, B' B', which are arranged thereon, as shown in Fig. 2. These arms are constructed of any suitable material, and are of the form shown in Fig. 3. Around the wall of the tub are arranged a series of independent steam-jets, C C. C' is a coil, which heats the tub A with superheated steam from the worm D, supplied through the pipe D'. A' is a manhole, through which the tub is charged. At the bottom of the tub A is an opening, *e*, leading into the reservoir E, and which chamber is a continuation of the tub A, and, like that vessel, is constructed of any suitable material, and is of any desired dimensions or capacity. This opening $e$ is closed by a sliding valve, $E^1$, and which is operated by a valve and lever, $E^2$. Over the opening $e$, and which connects the tub A and reservoir E, is placed a cylindrical strainer or filter, F, which is heated by a steam-pipe, $F^1$, as claimed in my patent dated April 15, 1873. By reference to Fig. 4 the form and arrangement of this pipe $F^1$ will be clearly seen, and how, as besides being a heating-agent, it also serves to brace and support the cylindrical strainer. $F^2$ is an independent perforated steam-pipe, and is used to clean the strainer, steam being admitted and shut off at pleasure by means of a cock, $f$. The chamber E is also heated by a steam-coil, $E^3$, which is supplied by the pipe D′ from the worm D. G is a still, in which is arranged a cone-shaped worm, D. This still at its lower section is provided with a jacket or outer casing, $G^1$, which is so arranged as to provide a steam-chamber, $g$. This still is seated over any suitable furnace, $G^2$. Steam is supplied to this chamber $g$ by any suitable means, and, being heated in its passage through the same, and around the under section of the still, is, in a superheated condition, fed to the worm D through its supporting-tubes $d$ $d$, and which communicate directly with the chamber $g$. The reservoir E and the interior chamber of the still G are connected by an opening, $h$, through the floor of the reservoir and a jacketed tube, H, which leads directly through the dome of the still and into its vaporizing-chamber. This opening $h$ is closed by a sliding valve, I, which is operated by a valve-rod and lever, I′. K is a strainer or filterer, and is placed over the opening $h$, and is in every respect a counterpart of the strainer F and $F^1$, and is constructed as shown in Fig. 4. From the center of the dome of the still leads a pipe, L, which communicates directly with a condenser, L′, which carries the steam off as rapidly as the water incorporated with the liquid resin is evaporated.

My process of bleaching, refining, and clarifying resin in an apparatus, such as described, is as follows: I take the commonest, cheapest, and most valueless grade of black resin, and, with a crusher, or by any other suitable means, break it into exceedingly small lumps, or, what is better, pulverize it or reduce it to fine powder. In this condition through the man-hole A′ the resin is poured into the tub A, and which tub is thoroughly heated by the steam-coil C. Motion from any suitable motor is now imparted to the shaft B, which secures the rapid revolution of the agitator, and which, through its arms B′ B′, so stirs and breaks up the entire mass as to insure its perfect and continuous disintegration. Steam is now supplied to the tubes C C, and thus, while under heat and being constantly upheaved and overturned by the agitator, the broken and disintegrated particles of resin are subjected to the direct raking action of the jets of steam. Practical experience has proven that when the resin is thus reduced to a powder and so stirred as to break up the mass, and in divided and broken portions is subjected to the direct action of heat and steam, it will melt and bleach in one-tenth the time usually required, and at a degree of heat far below that at which ever heretofore the same results have been accomplished. The black resin is full of impurities, and some of which contain, as is well known, coloring matter. Therefore, while in a liquid state, I strain or so filter the melted resin as to free it of nearly all foreign matter, and especially of such ingredients as contain coloring matter. The resin having been melted to the desired degree of liquidization, the sliding valve $E^1$ is by the lever $E^2$ opened, and through the opening $e$ the resin passes to the reservoir E, before which, however, by its passage through the filterer F, it has been thoroughly strained. Consequently when the liquid-resin reaches the reservoir it is comparatively free from impurities and comparatively pure, but it is yet opaque or of a whitish color, and which opaque condition is due entirely to the water or condensed steam which, in the tub A, has been incorporated with the resin. The resin is now from the reservoir E, through the opening $h$ and jacketed tube H, fed to the dome, being first strained, and here at the lowest possible degree of heat the water is vaporized and carried off by the pipe L to the condenser, leaving a pure quality of resin equal in value to that now known to the trade as extra pale, the product of the virgin dip.

What I claim as new, and desire to secure by Letters Patent of the United States, is—

1. The herein described process of reducing the resin to small lumps, or pulverizing the same to powder, to facilitate the operation of bleaching the same by the direct action of steam and heat, substantially as and for the purpose specified.

2. The process herein described of bleaching resin by the direct action of steam and heat, either with or without the fumes of sulphur or chlorine, while the mass of resin is under agitation, or is being so stirred as to insure its positive and continued disintegration, substantially as set forth.

3. The herein-described processes of bleaching, clarifying, and refining resin—first, by reducing it to a powder or small lumps and then bleaching by the direct action of steam and heat while the mass is under agitation; and then, in a suitable vessel, freeing the liquid resin from the water incorporated therewith through its evaporation, substantially as and for the purpose specified.

In testimony whereof I have signed my name to this specification in the presence of two subscribing witnesses.

ARCHIBALD K. LEE.

Witnesses:
  EDWIN JAMES,
  JOS. T. K. PLANT.